US008905659B2

(12) United States Patent
Jiang et al.

(10) Patent No.: US 8,905,659 B2
(45) Date of Patent: Dec. 9, 2014

(54) CARBON NANOTUBE BASED KEYBOARD

(75) Inventors: Kai-Li Jiang, Beijing (CN); Shou-Shan Fan, Beijing (CN); Jia-Shyong Cheng, New Taipei (TW); Liang Liu, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 348 days.

(21) Appl. No.: 13/196,025

(22) Filed: Aug. 2, 2011

(65) Prior Publication Data

US 2012/0193204 A1 Aug. 2, 2012

(30) Foreign Application Priority Data

Jan. 28, 2011 (CN) .......................... 2011 1 0031066

(51) Int. Cl.
*G06F 3/02* (2006.01)
*G06F 3/041* (2006.01)
*G06F 3/045* (2006.01)

(52) U.S. Cl.
CPC .................................... *G06F 3/0202* (2013.01)
USPC ........... 400/479; 400/472; 400/477; 345/173; 345/174

(58) Field of Classification Search
USPC ............................... 400/472, 477, 479.2, 479
See application file for complete search history.

(56) References Cited

U.S. PATENT DOCUMENTS

| | | | | |
|---|---|---|---|---|
| 5,062,198 | A * | 11/1991 | Sun | 29/622 |
| 8,120,595 | B2 * | 2/2012 | Kukulj et al. | 345/176 |
| 2002/0025837 | A1 * | 2/2002 | Levy | 455/566 |
| 2002/0049070 | A1 * | 4/2002 | Bick | 455/550 |
| 2002/0135457 | A1 * | 9/2002 | Sandbach et al. | 338/47 |
| 2008/0248235 | A1 | 10/2008 | Feng et al. | |
| 2008/0299031 | A1 | 12/2008 | Liu et al. | |
| 2009/0109068 | A1 | 4/2009 | Yeh et al. | |
| 2009/0160798 | A1 | 6/2009 | Jiang et al. | |
| 2009/0167709 | A1 * | 7/2009 | Jiang et al. | 345/173 |
| 2009/0167711 | A1 | 7/2009 | Jiang et al. | |
| 2010/0001976 | A1 * | 1/2010 | Jiang et al. | 345/174 |
| 2010/0127989 | A1 * | 5/2010 | Oba et al. | 345/168 |
| 2010/0214231 | A1 | 8/2010 | D'Souza et al. | |
| 2010/0317409 | A1 | 12/2010 | Jiang et al. | |
| 2011/0007026 | A1 * | 1/2011 | Chen et al. | 345/174 |

(Continued)

FOREIGN PATENT DOCUMENTS

| | | |
|---|---|---|
| CN | 101239712 | 8/2008 |
| CN | 101424989 | 5/2009 |

(Continued)

*Primary Examiner* — Daniel J Colilla
(74) *Attorney, Agent, or Firm* — Novak Druce Connolly Bove + Quigg LLP

(57) ABSTRACT

A keyboard includes a first substrate, a second substrate, a first electrode layer, and a second electrode layer. The first substrate includes a first upper surface and a first lower surface opposite the first upper surface. The second substrate is positioned apart from the first substrate and includes a second upper surface and a second lower surface. The second upper surface faces the first lower surface. The first electrode layer is positioned on the first lower surface and includes a number of first conductive layers disposed apart from each other and including a carbon nanotube layer structure. The second electrode layer is positioned on the second upper surface and includes a second conductive layer. A number of keys is positioned on the first upper surface or the second lower surface.

14 Claims, 8 Drawing Sheets

(56) References Cited

U.S. PATENT DOCUMENTS

| | | | |
|---|---|---|---|
| 2011/0134058 A1* | 6/2011 | Liu et al. | 345/173 |
| 2011/0267286 A1* | 11/2011 | Hsu | 345/173 |
| 2011/0299015 A1* | 12/2011 | Liu et al. | 349/96 |

FOREIGN PATENT DOCUMENTS

| | | | | |
|---|---|---|---|---|
| CN | 101452351 | | 6/2009 | |
| CN | 101464765 | | 6/2009 | |
| CN | 101852935 | | 10/2010 | |
| CN | 101901069 | | 12/2010 | |
| EP | 2128072 A1 | * | 12/2009 | ............... B66B 1/46 |
| JP | 2009140482 A | * | 6/2009 | ............. G06F 3/041 |
| TW | 200928908 | | 7/2009 | |
| TW | 200928913 | | 7/2009 | |
| TW | 200928914 | | 7/2009 | |
| TW | 201035845 | | 10/2010 | |
| TW | 200900348 | | 12/2010 | |
| TW | 201101780 | | 1/2011 | |
| TW | 201102887 | | 1/2011 | |

* cited by examiner

CARBON NANOTUBE BASED KEYBOARD

RELATED APPLICATIONS

This application claims all benefits accruing under 35 U.S.C. §119 from China Patent Application No. 201110031066.3, filed on Jan. 28, 2011, in the China Intellectual Property Office, the disclosure of which is incorporated herein by reference.

BACKGROUND

1. Technical Field

The disclosure relates to keyboards and, particularly, to a carbon nanotube-based keyboard.

2. Description of Related Art

Conventional keyboards are made of hard plastics and are rigid in structure. Furthermore, the conventional keyboards are relatively large in size when paired with small electronic devices, which then becomes a bulky accessory with limited portability.

What is needed, therefore, is a keyboard that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
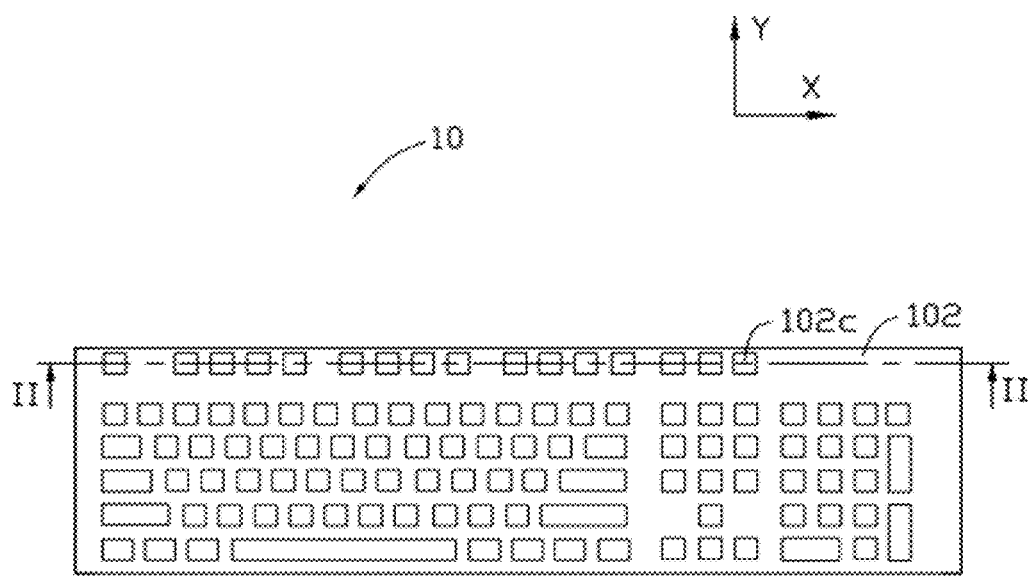
FIG. 1 is a schematic top view of an embodiment of a keyboard.
Figure 2:
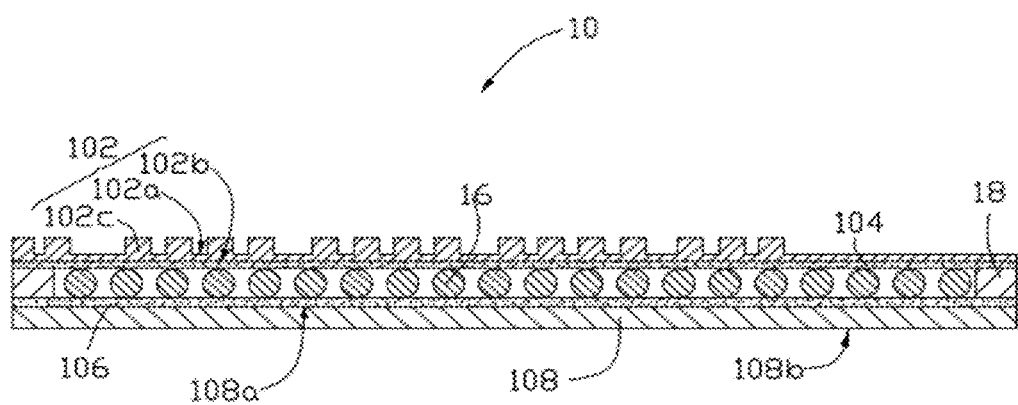
FIG. 2 is a schematic section view along line II-II of the keyboard in FIG. 1.

Referring to FIG. 1 and FIG. 2, one embodiment of a keyboard 10 comprises a first substrate 102, a first electrode layer 104, a second electrode layer 106, a plurality of dot spacers 16, and a second substrate 108. The first substrate 102 and the second substrate 108 are located apart from each other. The first substrate 102 includes a first upper surface 102a and a first lower surface 102b opposite the first upper surface 102a. The first upper surface 102a is an operating surface for users. The second substrate 108 includes a second upper surface 108a and a second lower surface 108b. The second upper surface 108a faces the first lower surface 102b. The plurality of spacers 16 is located between the first lower surface 102b and the second upper surface 108a. The first electrode layer 104 is located on the first lower surface 102b. The first electrode layer 104 can be fixed on the first lower surface 102b via adhesive or mechanical method. The second electrode layer 106 is located on the second upper surface 108a. The second electrode layer 106 can be fixed on the first lower surface 102b via adhesive or mechanical method. The first electrode layer 104 faces the second electrode layer 106. The location of the first electrode layer 104 and the second electrode layer 106 can be changed with each other. That is to say, the first electrode layer 104 can be located on the second upper surface 108a and the second electrode layer 106 can be located on the first lower surface 102b.

A material of the first substrate 102 is flexible and insulative. The material of the first substrate 102 can be resin, rubber, plastics or combination thereof. The material of the first substrate can be polycarbonate (PC), polymethyl methacrylate acrylic (PMMA), polyethylene terephthalate (PET), polyethersulfones (PES), polyvinylchloride (PVC), benzocyclobutenes (BCB), polyesters, or acrylic resins. A number of keys 102c are located on the first upper surface 102a of the first substrate 102. Each of the number of keys 102c can have a different mark from the other keys 102c, such as letters. The keys 102c are arranged to form a plurality of rows, and each row includes at least one key 102c. Each row is oriented in an X direction as shown in FIG. 1. Each row can include a plurality of keys 102c, and the keys 102c in the same row can have the same width. The length of the keys 102c in the same row can be different from each other. Each of the keys 102c can have a rectangular shape having a width and a length in the X direction, or any other shape as desired. In one embodiment, the keys 102c are a plurality of protrusions integrated with the first substrate 102 on the first upper surface 102a. In one embodiment according to FIGS. 1 and 2, the first substrate 102 is made of a rubber material, and six lines of keys 102c are formed on the first upper surface 102a having the marks on the keys 102c similar to a conventional keyboard.

A material of the second substrate 108 can be the same as the first substrate 102. In one embodiment, the material of the second substrate 108 is a fabric material.

Figure 3:
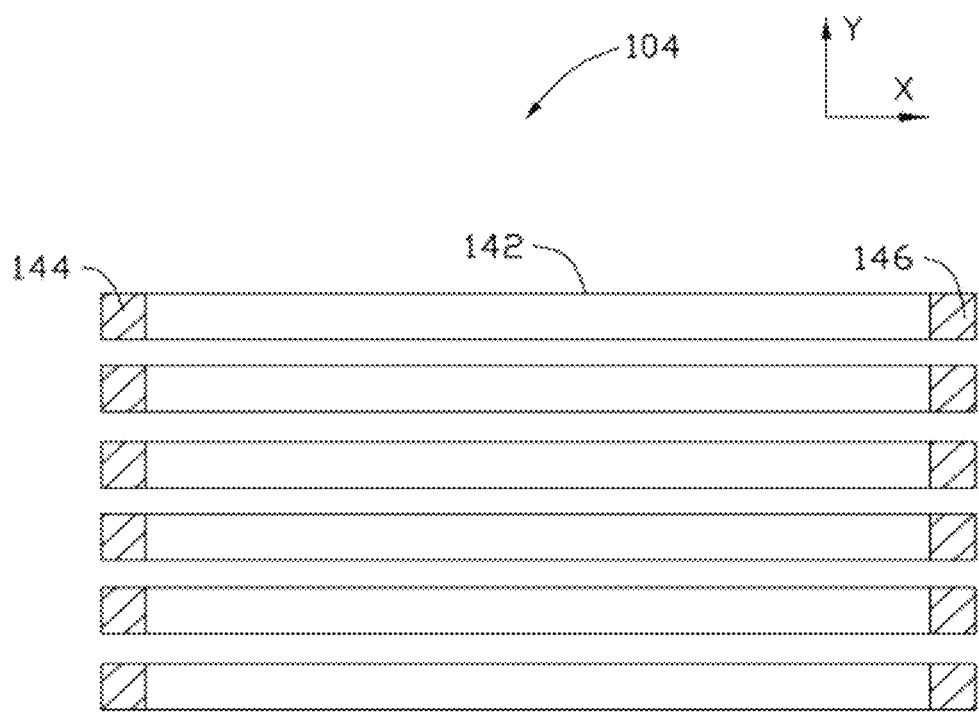
FIG. 3 is a schematic view of a first electrode layer used in the keyboard of FIG. 1.

Referring also to FIG. 3, the first electrode layer 104 includes a plurality of first conductive layers 142, a plurality of first electrodes 144, and a plurality of second electrodes 146. The plurality of first electrodes 144 and the plurality of second electrodes 146 are electrically connected to the plurality of first conductive layers 142 and located separately on two opposite ends of the plurality of first conductive layers 142. Each first conductive layer 142 is electrically connected with one first electrode 144 and one second electrode 146. The plurality of first conductive layers 142 can be bar-shaped and located apart from each other. The first conductive layers 142 can be parallel with each other. In one embodiment, the first conductive layers 142 are primarily oriented along the X direction. The first electrodes 144 and the second electrodes 146 are substantially arranged along the Y direction. The X direction is substantially perpendicular with the Y direction. A distance between adjacent conductive layers 142 can be uniform or random. The distance can be determined by the keys 102c, and can be in a range from about 10 micrometers to about 1 centimeter. In the embodiment according to FIG. 3, the distance between adjacent first conductive layers 142 is uniform, and is about 2 millimeters. The width or length of the first conductive layers 142 can be uniform or different from each other. In the embodiment according to FIG. 3, the width of the first conductive layers 142 is about 1 centimeter, and the length of the first conductive layers 142 is about 30 centimeters.

One first conductive layer 142 located between one first electrode 144 and one second conductive layer 146 forms a conductive passage. Therefore, a plurality of conductive passages is formed between the first electrodes 144 and the second electrodes 146. The number of conductive passages is greater than the number of rows of the keys 102c, to ensure that location of each key 102c can be detected. A distance between adjacent first conductive layers 142 is equal to or less than a distance between the adjacent rows of the keys 102c. In one embodiment according to FIG. 3, the number of the first conductive layer 142 is six, and six conductive passages are formed. The first electrodes 144 are input electrodes while the second electrodes 146 are output electrodes. In other embodiment, the second electrodes 146 are input electrodes while the first electrodes 144 are output electrodes.

Figure 4:
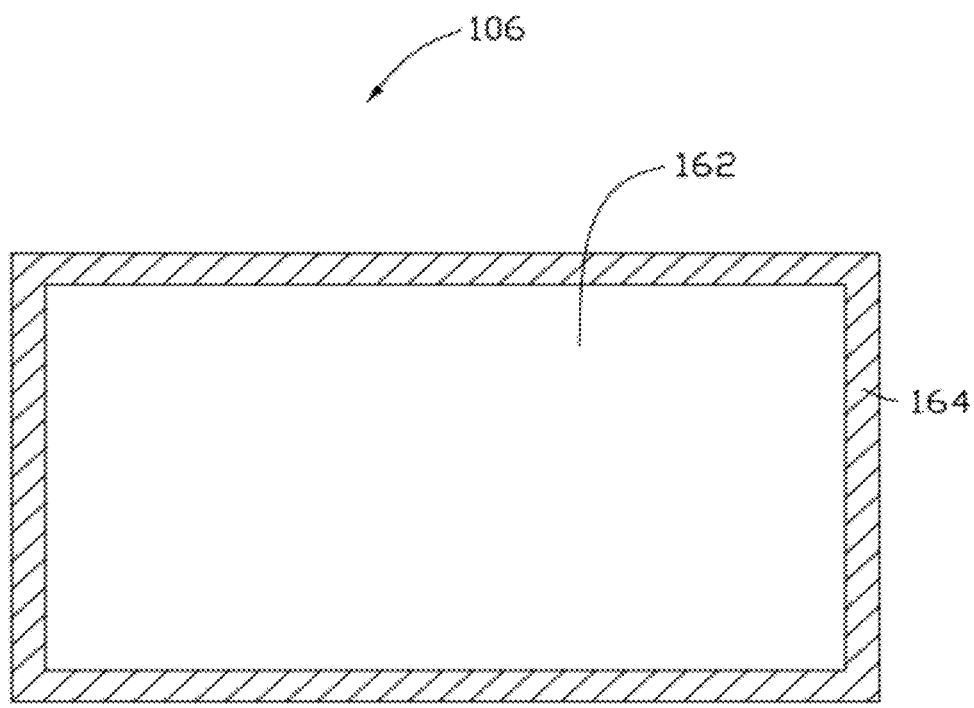
FIG. 4 is a schematic view of a second electrode layer used in the keyboard of FIG. 1.

Referring to FIG. 4, the third electrode layer 106 includes a second conductive layer 162 and a third electrode 164. The third electrode 164 is electrically connected with the second conductive layer 162. The third electrode 164 surrounds and contacts the second conductive layer 162. In one embodiment illustrated in FIG. 4, the second electrode 164 is located on a surface of the second conductive layer 162 and symmetrically aligned with four sides of the second conductive layer 162.

An insulative layer 18 is further provided between the first and second substrates 102, 108 and surrounds the first electrode layer 104 or the second electrode layer 106. In one embodiment, the insulative layer 18 is in the form of a rectangular frame. The first electrode layer 104 faces, but is spaced from, the second electrode layer 106. The dot spacers 16 are located on the second conductive layer 142. A distance between the second electrode layer 106 and the first electrode layer 104 is typically in a range from about 1 cm to 2 cm. The insulative layer 18 and the dot spacers 16 are made of, for example, insulative resin or any other suitable insulative material. Electrical insulation between the first electrode layer 104 and the second electrode layer 106 is provided by the insulative layer 18 and the dot spacers 16. It is to be understood that the dot spacers 16 are optional, particularly if the size of the keyboard 10 is relatively small.

The first electrodes 144, the second electrodes 146 and the third electrodes 164 are made of conductive materials, such as metal, alloy, or indium tin oxide (ITO). The shape of the third electrode 164 can be linear, such as wire-shaped or bar-shaped. The shapes of the first electrodes 144 and the second electrodes 146 can be block-shaped. The cross-sectional shape of the first electrodes 144, the second electrodes 146, and the third electrodes 164 can be round, polygonal such as a square, trapezium, or triangle, or any other shape. The thickness of the first electrodes 144, the second electrodes 146 and the third electrodes 164 can be any size, depending on the design. In one embodiment, the first electrodes 144 and the second electrodes 146 are both silver spots made by a screen print method, and the third electrodes 164 are silver wire made by a screen print method.

Each first conductive layer 142 comprises a carbon nanotube layer structure. The carbon nanotube layer structure includes a plurality of carbon nanotubes joined by van der Waals attractive force therebetween. The carbon nanotube layer structure can be a substantially pure structure of carbon nanotubes, with few impurities. The carbon nanotube layer structure can be a freestanding structure, that is, the carbon nanotube layer structure can be supported by itself without a substrate. For example, if at least one point of the carbon nanotube layer structure is held, the entire carbon nanotube layer structure can be lifted without being destroyed.

The carbon nanotubes in the carbon nanotube layer structure can be orderly or disorderly arranged. The term 'disordered carbon nanotube layer structure' refers to a structure where the carbon nanotubes are arranged along different directions, and the aligning directions of the carbon nanotubes are random. The number of the carbon nanotubes arranged along each different direction can be almost the same (e.g. uniformly disordered). The disordered carbon nanotube layer structure can be isotropic, namely the carbon nanotube layer structure has properties identical in all directions of the carbon nanotube layer structure. The carbon nanotubes in the disordered carbon nanotube layer structure can be entangled with each other.

The carbon nanotube layer structure including ordered carbon nanotubes is an ordered carbon nanotube layer structure. The term 'ordered carbon nanotube layer structure' refers to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube layer structure can be selected from single-walled, double-walled, and/or multi-walled carbon nanotubes. The carbon nanotube layer structure can include at least one carbon nanotube film.

Figure 5:
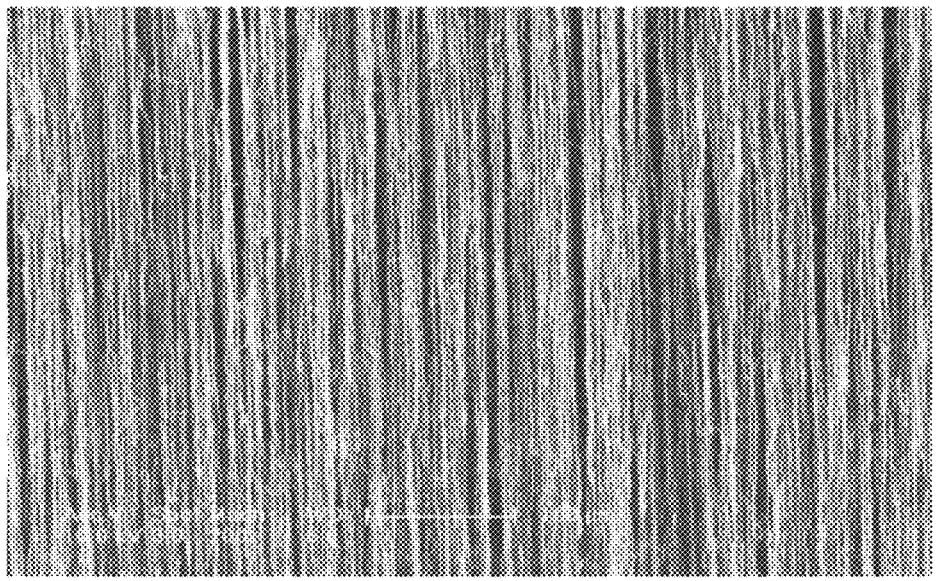
FIG. 5 shows a Scanning Electron Microscope image of a drawn carbon nanotube film.

In one embodiment, the carbon nanotube film can be a drawn carbon nanotube film. Referring to FIG. 5, the drawn carbon nanotube film includes a number of successive and oriented carbon nanotubes joined end-to-end by van der Waals attractive force therebetween. The drawn carbon nanotube film is a free-standing film. Each drawn carbon nanotube film includes a number of successively oriented carbon nanotube segments joined end-to-end by van der Waals attractive force therebetween. Each carbon nanotube segment includes a number of carbon nanotubes substantially parallel to each other, and joined by van der Waals attractive force therebetween. Some variations can occur in the carbon nanotube film. The carbon nanotubes in the drawn carbon nanotube film are oriented along a preferred orientation. The drawn carbon nanotube film can be treated with an organic solvent to increase the mechanical strength and toughness of the drawn carbon nanotube film and reduce the coefficient of friction of the drawn carbon nanotube film. The thickness of the carbon nanotube film can range from about 0.5 nm to about 100 μm.

The carbon nanotubes in the drawn carbon nanotube structure can be single-walled, double-walled, and/or multi-walled carbon nanotubes. The diameters of the single-walled carbon nanotubes can range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers. The lengths of the carbon nanotubes can range from about 200 μm to about 900 μm.

The carbon nanotube layer structure can include at least two stacked carbon nanotube films. The carbon nanotubes in the drawn carbon nanotube film are aligned along one preferred orientation, an angle can exist between the orientations of carbon nanotubes in adjacent drawn carbon nanotube films, whether stacked or adjacent. An angle between the aligned directions of the carbon nanotubes in two adjacent drawn carbon nanotube films can range from about 0 degrees to about 90 degrees, such as the angle can be about 15 degrees, 45 degrees or 60 degrees.

In other embodiments, the carbon nanotube film can be a flocculated carbon nanotube film. The flocculated carbon nanotube film can include a plurality of long, curved, disordered carbon nanotubes entangled with each other. Furthermore, the flocculated carbon nanotube film can be isotropic. The carbon nanotubes can be substantially uniformly dispersed in the carbon nanotube film. Adjacent carbon nanotubes are acted upon by van der Waals attractive force to obtain an entangled structure with micropores defined therein. Because the carbon nanotubes in the carbon nanotube layer structure are entangled with each other, the carbon nanotube layer structure employing the flocculated carbon nanotube film has excellent durability, and can be fashioned into desired shapes with a low risk to the integrity of the carbon nanotube layer structure. The thickness of the flocculated carbon nanotube film can range from about 0.5 nm to about 1 mm.

In other embodiments, the carbon nanotube film can be a pressed carbon nanotube film. The carbon nanotubes in the pressed carbon nanotube film are arranged along a same direction or along different directions. The carbon nanotubes in the pressed carbon nanotube film can rest upon each other. Adjacent carbon nanotubes are attracted to each other and are joined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. If the carbon nanotubes in the pressed carbon nanotube film are arranged along different directions, the carbon nanotube layer structure can be isotropic. Here, "isotropic" means the carbon nanotube film has identical properties in all directions substantially parallel to a surface of the carbon nanotube film. The thickness of the pressed carbon nanotube film can range from about 0.5 nm to about 1 mm.

Structures of the first conductive layers 142 can be the same or different form each other. In one embodiment, each first conductive layer 142 is a drawn carbon nanotube film, the carbon nanotubes in the carbon nanotube film are oriented from the first electrode 144 to the second electrode 146.

The second conductive layer 162 can be the carbon nanotube layer structure as disclosed above. In one embodiment, the second conductive layer 162 is a flocculated carbon nanotube film, and has a thickness of about 10 micrometers.

The keyboard 10 can be connected to an electronic device via USB port or Bluetooth system. The first electrodes 144 and the third electrode 164 are the input electrodes configured to receive input voltage signals, and the second electrodes 146 are the output electrodes configured to output voltage signals. When one of the keys 102c is pressed down, the first conductive layer 142 contacts the second conductive layer 162, and the location of the pressed key 120c can be detected by measuring a voltage of each second electrode 146. If a plurality of keys 102c is pressed, the second electrodes 146 can be used to detect the location of each touching point. The location of one pressed keys 102c at the Y direction can be detected by the corresponding second electrode 146. The location of the touching point at the X direction can be detected by the voltage change of the second electrode 146, because a change of the voltage of the second electrodes 146 is related to a distance between the pressed key 102c and the second electrode 146. As such, the location of each pressed key 102c can be detected. Because the first conductive layers 142 do not affect each other, the locations of the plurality of touching points can be detected at the same time.

The keyboard 10 disclosed in the present disclosure is a flexible keyboard, which increases the portability of the keyboard 10. When the keyboard 10 is connected with an electronic device, such as a mobile phone, the keyboard 10 can wrap around the mobile phone to protect the mobile phone. If the second substrate 108 of the keyboard 10 is made of fabric, the second substrate 108 can be used to clean the screen of the mobile phone.

Figure 6:
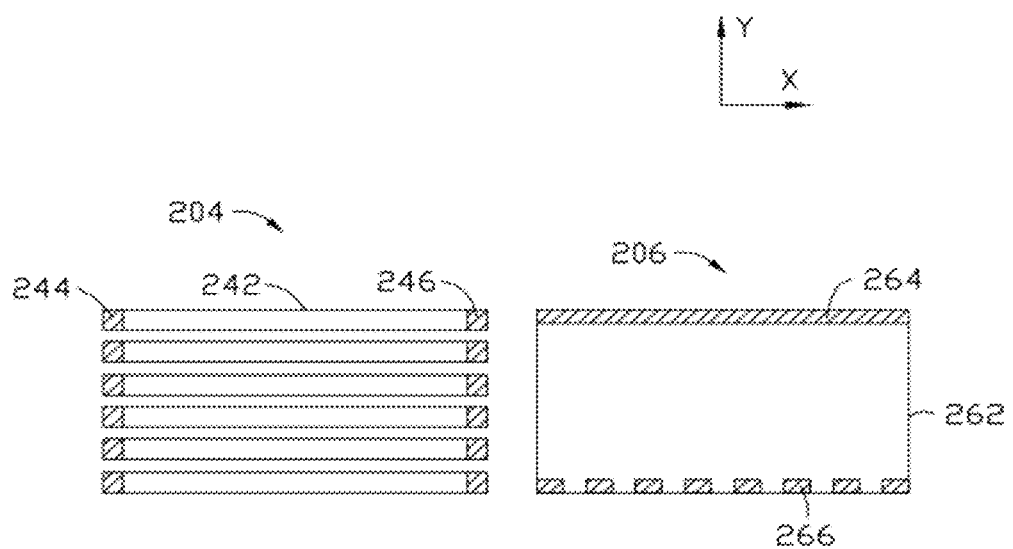
FIG. 6 is a schematic view of a first electrode layer and a second conducive layer used in a keyboard of another embodiment.

A keyboard according to another embodiment includes a first electrode layer 204 and a second electrode layer 206 having the structures as shown in FIG. 6.

The first electrode layer 204 includes a plurality of first conductive layers 242, a plurality of first electrodes 244 and a plurality of second electrodes 246. The characteristics of the first electrode layer 204 are the same as the first electrode 104 disclosed above.

The second electrode layer 206 includes a second conductive layer 262, a third electrode 264, and a plurality of fourth electrodes 266. The third electrode 264 is located at one end of and electrically connected with the second conductive layer 262. The plurality of fourth electrodes 266 is located at another end of and electrically connected with the second conductive layer 262. The plurality of fourth electrodes 266 are electrically connected to each other by the second conductive layer 262. The third electrode 264 is oriented along an X direction. The plurality of fourth electrodes 266 is arranged along the X direction. A distance between adjacent fourth electrodes 266 can be uniform, and in a range from about 1 micrometer to about 1 centimeter. The second conductive layer 262 can be a conductive film having different resistances along different directions, i.e., the resistivity of the second conductive layer 262 in two-dimensional space is different. A resistivity of the second conductive layer 262 along the X direction is larger than the resistivity along the Y direction. The second conductive layer 262 can include an ordered carbon nanotube layer structure. The ordered carbon nanotube layer structure includes a plurality of carbon nanotubes oriented in a same direction. In one embodiment, the ordered carbon nanotube layer structure includes at least one drawn carbon nanotube film. The ordered carbon nanotube layer structure can include at least two drawn carbon nanotube films overlapping each other. The carbon nanotubes in the at least two drawn carbon nanotube films are oriented in a same direction. In one embodiment according to FIG. 6, the carbon nanotubes in the carbon nanotube layer structure are oriented along the Y direction. A conductive passage is formed between each fourth electrode 266 and the third electrode 264, and a plurality of conductive passages is formed on the second electrode layer 206. The plurality of conductive passages on the second electrode layer 206 is substantially perpendicular to the conductive passages on the first electrode layer 204.

When the keyboard is in use, low voltage is inputted into the keyboard via the plurality of first electrode 244 and the plurality of second electrodes 246, high voltage is inputted via the third electrode 264, and the location along the X direction of a pressed key can be detected by the fourth electrodes 266 because the pressed key corresponds with one conductive passage defined by one fourth electrode 266. Low voltage is inputted into the keyboard via the third electrode 264 and the fourth electrodes 266, and high voltage is inputted via the first electrodes 244. The second electrodes 246 can detect the location along the Y direction of the pressed key. When a plurality of keys is pressed at the same time, because the conductive passages do not affect each other, the locations of the plurality of touching points can be detected at the same time. Other characteristics of the keyboard are the same as the keyboard 10 disclosed above.

Figure 7:
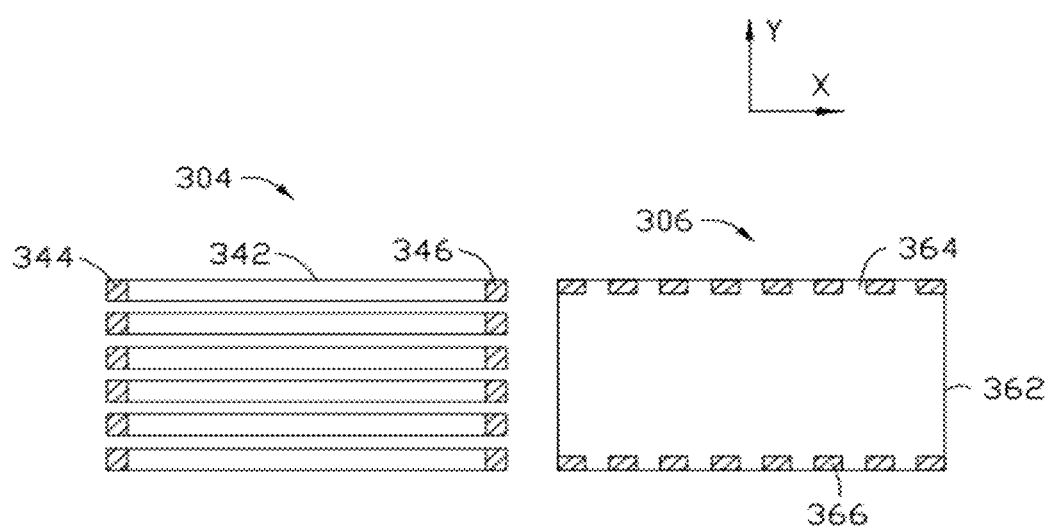
FIG. 7 is a schematic view of a first conductive layer and a second electrode layer used in a keyboard of still another embodiment.

A keyboard according to another embodiment includes a first electrode layer 304 and a second electrode layer 306 having the structures as shown in FIG. 7.

The first electrode layer 304 includes a plurality of first conductive layers 342, a plurality of first electrodes 344, and a plurality of second electrodes 346. The characteristics of the first electrode layer 304 are the same as the first electrode layer 104 disclosed above.

The second electrode layer 306 includes a second conductive layer 362, a plurality of third electrodes 364, and a plurality of fourth electrodes 366. The plurality of third electrodes 364 is located at one end of and electrically connected with the second conductive layer 362. The plurality of third electrodes 364 are electrically connected with each other by the second conductive layer 362. The plurality of fourth electrodes 366 is located at another end of and electrically connected with the second conductive layer 362. The plurality of fourth electrodes 366 are electrically connected with each other by the second conductive layer 362. The plurality of third electrode 364 is oriented along the X direction. A distance between adjacent third electrodes 364 can be uniform and in a range from about 1 micrometer to about 1 centimeter. The fourth electrodes 366 are arranged along the X direction. A distance between adjacent fourth electrodes 366 can be uniform, and in a range from about 1 micrometer to about 1 centimeter. The first conductive layer 362 can be a conductive film having different resistances along different directions, i.e., the resistivity of the first conductive layer 362 in two-dimensional space is different. The characters of the second conductive layer 362 are the same as the second conductive layer 262 disclosed above. A conductive passage is formed between each third electrode 366 and each fourth electrode 364, thus a plurality of conductive passages is formed on the second electrode layer 306. The plurality of conductive passages on the second electrode layer 306 is substantially perpendicular to the conductive passages on the first electrode layer 304.

In use of the keyboard, the first electrodes 344 and the second electrodes 346 can be used as input electrodes alternatively. The third electrodes 364 and the fourth electrodes 366 can be used as output electrodes alternatively. In one embodiment, low voltage is input into the keyboard via the plurality of first electrodes 344 and the second electrodes 346, high voltage is input via the third electrodes 364, and the fourth electrodes 366 are used as output electrodes. The location along the X direction of a pressed key can be detected by the fourth electrodes 366. Low voltage is input into the keyboard via the third electrodes 364 or the fourth electrodes 366, high voltage is input via the first electrodes 344, and the second electrodes 346 are used as output electrodes. The location along the Y direction of the pressed key can be detected by the second electrodes 346. Other characteristics of the keyboard are the same as the keyboard 10 disclosed above.

Figure 8:
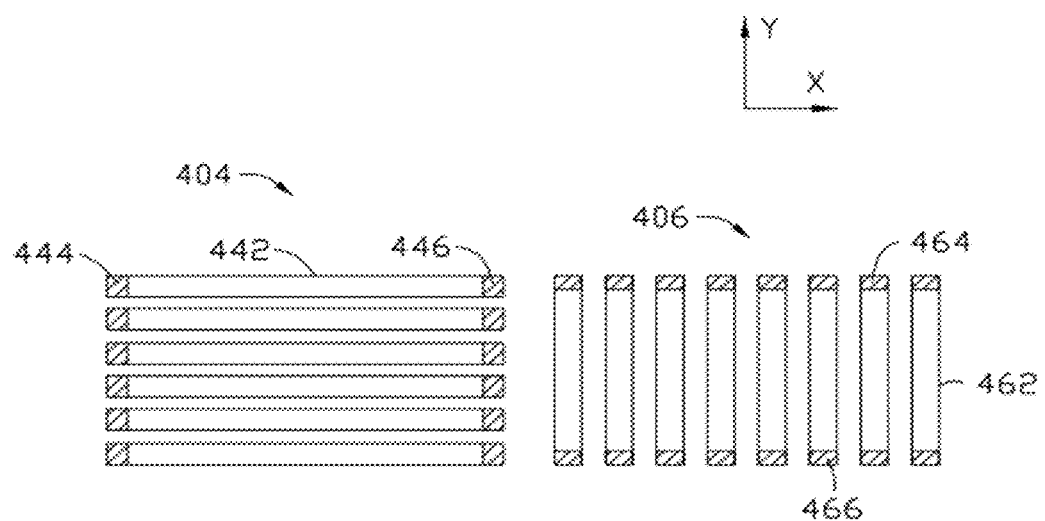
FIG. 8 is a schematic view of a first electrode layer and a second electrode layer used in a keyboard of one embodiment.

A keyboard according to another embodiment includes a first electrode layer 404 and a second electrode layer 406 having structures as shown in FIG. 8.

The first electrode layer 404 includes a plurality of first conductive layers 442, a plurality of first electrodes 444, and a plurality of second electrodes 446. Characteristics of the first electrode layer 404 are the same as the first electrode layer 104 as disclosed above.

The second electrode layer 406 includes a plurality of second conductive layers 462, a plurality of third electrodes 464, and a plurality of fourth electrodes 466.

In one embodiment, the second conductive layers 462 are oriented along the Y direction. The third electrodes 464 and the fourth electrodes 466 are arranged in the Y direction. Other characteristics of the second electrode layer 406 are the same as the first electrode layer 142 as disclosed above.

In use of the keyboard, the first electrodes 444 and the second electrodes 446 can be used as input electrodes alternatively. The third electrodes 464 and the fourth electrodes 466 can be used as output electrodes alternatively. In one embodiment, low voltage is input into the keyboard via the plurality of first electrodes 444 and the second electrodes 446, high voltage is input via the third electrodes 464, and the fourth electrodes 466 are used as output electrodes. The location along the X direction of a pressed key can be detected by the fourth electrodes 466. Low voltage is input into the keyboard via the third electrodes 464 or the fourth electrodes 466, high voltage is input via the first electrodes 444, and the second electrodes 446 are used as output electrodes. The location along Y direction of the pressed key can be detected by the second electrodes 446.

Other characteristics of the keyboard are the same as the keyboard 10 disclosed above.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A keyboard comprising:
    a first substrate comprising a first upper surface and a first lower surface opposite the first upper surface;
    a second substrate located apart from the first substrate and comprising a second upper surface and a second lower surface opposite the second upper surface, the second upper surface facing the first lower surface;
    a first electrode layer positioned on the first lower surface and comprising a plurality of first conductive layers positioned apart from each other, each of the plurality of first conductive layers comprising a first carbon nanotube layer structure, the plurality of first conductive layers is parallel with each other and oriented in a first direction;
    a second electrode layer positioned on the second upper surface and comprising at least one second conductive layer; and
    a plurality of rows of keys located on the first upper surface, each of the plurality of rows is parallel to the first direction, and an amount of the plurality of first conductive layers is larger than an amount of the plurality of rows, wherein each key is detectable by at least one first conductive layer.

2. The keyboard of claim 1, wherein the first electrode layer further comprises a plurality of first electrodes and a plurality of second electrodes, one of the plurality of first electrodes and one of the plurality of second electrodes are positioned on two opposite ends of and are electrically connected with one of the plurality of first conductive layers.

3. The keyboard of claim 1, wherein each of the plurality of first conductive layers comprises a plurality of carbon nanotubes oriented along the first direction.

4. The keyboard of claim 3, wherein the plurality of carbon nanotubes in each of the plurality of first conductive layers are joined end to end by van der Waals attractive force.

5. The keyboard of claim 1, wherein the second conductive layer comprises a second carbon nanotube layer structure comprising a plurality of carbon nanotubes oriented along a second direction, and the second direction is perpendicular to the first direction.

6. The keyboard of claim 5, wherein the second electrode layer further comprises a third electrode, positioned on one end of the at least one second conductive layer and oriented along the first direction; and a plurality of fourth electrodes, positioned on another end of the at least one second conductive layer and arranged along the first direction.

7. The keyboard of claim 5, wherein the second electrode layer further comprises a plurality of third electrodes, positioned on one end of the at least one second conductive layer and arranged in the first direction; and a plurality of fourth, electrodes positioned on another end of the at least one second conductive layer and arranged in the first direction.

8. The keyboard of claim 1, wherein the second electrode layer comprises a plurality of second conductive layers positioned apart from each other and oriented along a second direction.

9. The keyboard of claim 8, wherein each of the plurality of second conductive layers comprises a second carbon nanotube layer structure.

10. The keyboard of claim 1, wherein the second electrode layer comprises a third electrode positioned on a surface of the at least one second conductive layer and symmetrically aligned with four sides of the second conductive layer.

11. The keyboard of claim 1, wherein each of the plurality of first conductive layers is positioned between a respective first electrode and a respective second electrode and defines a respective conductive passage.

12. The keyboard of claim 1, wherein materials of the first substrate and the second substrate are flexible.

13. The keyboard of claim 12, wherein the plurality of keys is positioned on the first upper surface of the first substrate, and a material of the second substrate is fabric.

14. The keyboard of claim 1, wherein the plurality of protrusions are integrated with the first substrate or the second substrate on which the plurality of protrusions are located thereon.

\* \* \* \* \*